United States Patent [19]

Uhorczak

[11] 4,079,521
[45] Mar. 21, 1978

[54] ELECTRICALLY ACTUATED LEVEL

[76] Inventor: Theodore Uhorczak, 1203 68th Ave., Philadelphia, Pa. 19126

[21] Appl. No.: 752,219

[22] Filed: Dec. 20, 1976

[51] Int. Cl.² .............................................. G01C 9/06
[52] U.S. Cl. ...................................................... 33/366
[58] Field of Search .......................................... 33/366

[56] References Cited

U.S. PATENT DOCUMENTS

| 2,511,525 | 6/1950 | Bradwell et al. ............ | 33/366 |
| 3,657,695 | 4/1972 | Birmingham ................ | 33/366 X |
| 3,861,052 | 1/1975 | Siegfried .................... | 33/366 |
| 4,003,134 | 1/1977 | Adams ....................... | 33/366 |

FOREIGN PATENT DOCUMENTS

| 246,624 | 1/1961 | Australia ..................... | 33/366 |
| 22,619 | 10/1947 | Finland ....................... | 33/366 |

*Primary Examiner*—Charles E. Phillips
*Attorney, Agent, or Firm*—Caesar, Rivise, Bernstein & Cohen, Ltd.

[57] ABSTRACT

An electrically actuated level having a housing with a straight edge for providing a visual signal to indicate either a horizontal or vertical orientation of said straight edge or for indicating a deviation therefrom and the direction of said deviation. The level also comprises a rotatable means mounted in the housing. Liquid contact switching means are mounted in the rotatable means generally parallel to a first axis thereon. The rotatable means is arranged to be pivoted from a first position through 90° to a second position and vice versa and to be locked in either of said positions to enable said first axis of the rotatable means to be brought into a generally horizontal orientation irrespective of whether the straight edge of the level is oriented generally horizontally or vertically. The level also includes an electric power source means and light-emitting means connected to said power source means and said liquid switch means. Main off/on switch means are provided to enable said power source means whenever said rotatable means are in said first or said second position. The liquid switch means are positioned on the rotatable means such that when said first axis is disposed horizontally the switches complete a first circuit to provide a first light to indicate that the straight edge is in the desired horizontal or vertical orientation. When the left side of the rotatable means is disposed below the right side the switches complete a second circuit to provide a second light and when the right side of the mounting means is disposed below the left side the switches complete a third circuit to provide a third light. The first light is one color and the second and third lights are a second color.

6 Claims, 12 Drawing Figures

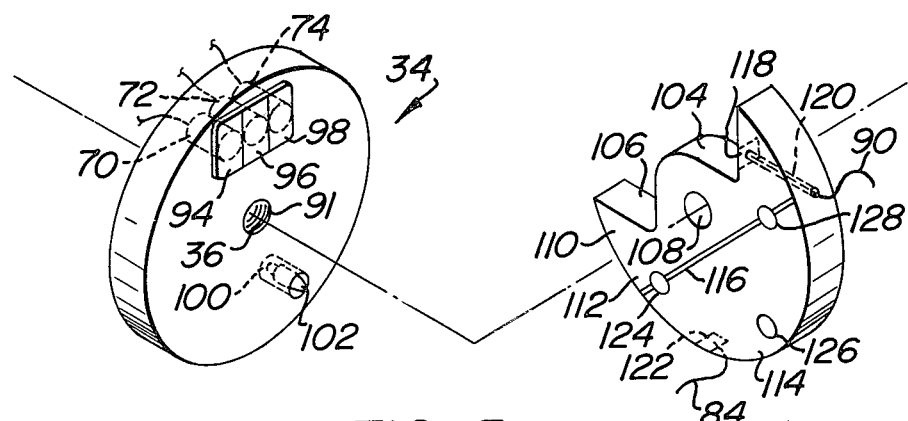
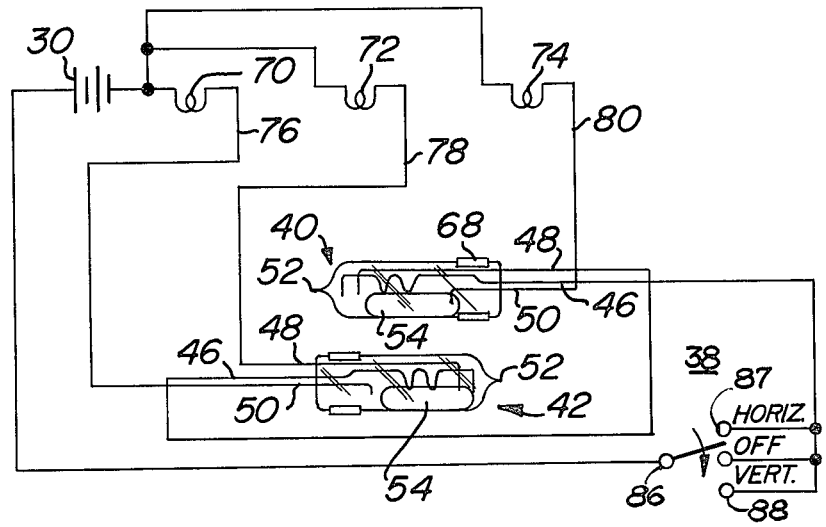
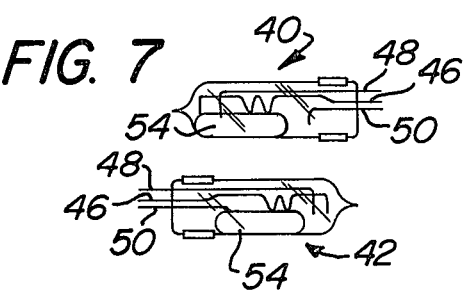
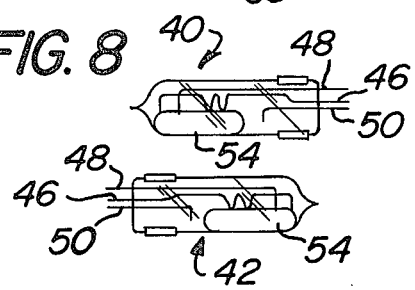
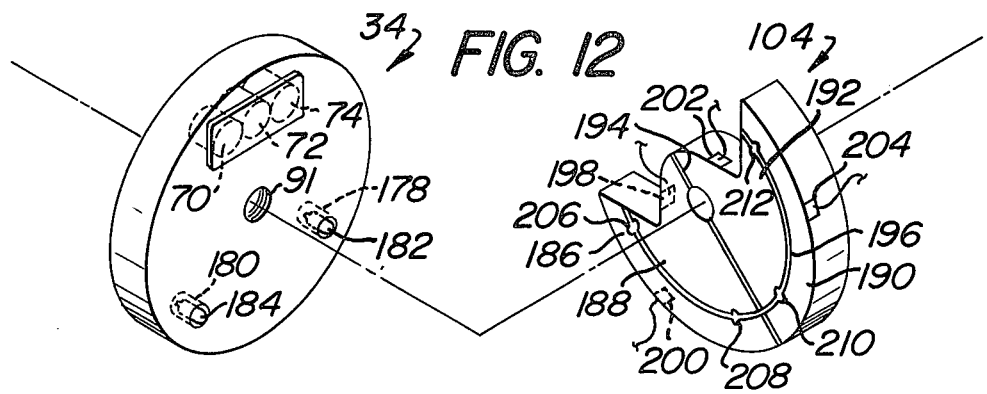

ELECTRICALLY ACTUATED LEVEL

This invention relates generally to measuring instruments and more particularly to electrically actuated levels.

Various electrically actuated levels have been proposed in the literature for use by carpenters, masons and others in the building trade. Such levels commonly include means for providing a signal, such as an illuminated lamp or meter, which can be seen under dim ambient lighting situations, thereby enabling the level to be used in application wherein conventional bubble spirit levels would be of little or no value. While the electrically actuated levels disclosed in the patent literature are generally operative to accomplish their intended function, those prior art levels which are capable of precision operation are relatively expensive and complex, as well as being relatively bulky, thereby rendering them unsuitable for general purpose applications. Those prior art levels which are simpler in construction are generally relatively crude devices which are incapable of providing precise and accurately repeatable readings.

For example, in U.S. Pat. No. 3,324,564 (Wright et al) there is disclosed an electrically operated level having two units. One unit comprises a level assembly and the second unit comprises a power source, a meter and control means electrically connected to the level assembly. The level assembly includes a bubble spirit vial, a lamp filament and a pair of light receptors. The filament provides light which is directed through the spirit vial to the receptors placed thereabove. The receptors are connected via electrical circuitry to the meter and provide an indication of the position of the bubble within the vial, thereby indicating the orientation of the level.

In Swedish Pat. No. 124,287 there is disclosed an electrically operated level ostensibly useful for general leveling applications. The level comprises a pair of mercury switches, each having a pair of electrodes. The electrodes are interconnected to a battery and to three lamps for illuminating the same to provide visual signals indicating whether the level is sloped in one direction, is horizontal, or is sloped in the other direction.

In U.S. Pat. No. 3,196,552 (Richards) there is disclosed another level ostensibly suited for general purpose uses. The level comprises a body portion having an orientation-sensing assembly mounted therein and adjustable through a predetermined angular range to enable the level to determine any angular orientation with respect to horizontal. The sensing assembly comprises a mercury switched arranged to bridge a pair of contacts to effect the illumination of a lamp whenever the body of the level is oriented in a predetermined orientation.

Accordingly, it is a generaly object of the instant invention to provide an electrically actuated level which overcomes the deficiencies of the prior art.

It is a further object of this invention to provide a level capable of providing a visual signal whenever the desired orientation, be it horizontal or vertical, is achieved and to provide a visual signal indicating the direction of the deviation from the desired orientation when such a deviation exists.

It is still a further object of this invention to provide a precision electrically actuated level which is simple in construction and can be made inexpensively.

These and other objects of this invention are achieved by providing a level for the determination of either a horizontal or a vertical orientation and for indicating a deviation therefrom and the direction of said deviation. The level comprises a housing mounting electrical power means, main switch means and rotatble mounting means, said housing having a first straight edge. First switching means are mounted on said rotatable mounting means generally parallel to a first axis of said mounting means. The rotatable mounting means is rotatable from a first position through a 90° arc to a second position and vice versa to enable said first axis of the rotatable mounting means to be brought into a generally horizontal orientation irrespective of whether the straight edge of the level is oriented generally horizontally or vertically. The rotatable mounting means has a right and left hand side irrespective of whether it is in the first or second position. Means are provided for locking the mounting means in either of the first or second positions. The main switch means enables the electrical power source when the rotatable mounting means is in the first or second position. The first switching means is positioned on the mounting means such that when the first axis is disposed horizontally the first switching means completes a first circuit from the power source to provide a first signal. When the left side of the rotatable mounting means is disposed below the right side thereof the first switching means completes a second circuit from the power source to provide a second signal. When the right side of the rotatable mounting means is disposed below the left side the first switching means completes a third circuit from the power source to provide a third signal.

Other objects and many of the attendant advantages of this invention will be readily appreciated as the same becomes better understood by reference to the following detailed description when considered in connection with the accompanying drawing wherein:

FIG. 5 is an exploded perspective view of a portion of the level shown in FIG. 1;

FIG. 6 is a schematic diagram of the electrical components of the level of FIG. 1 and showing the condition of the switches when the right side of the level is low;

FIG. 7 is a view of the switches shown in FIG. 6 but in the condition when the left side of the level is low;

FIG. 8 is a view similar to that of FIG. 7 but showing the switches when the level is in the desired orientation;

FIG. 12 is an exploded perspective view of the portion of the alternative embodiment of the level of FIG. 1.

Figure 1:
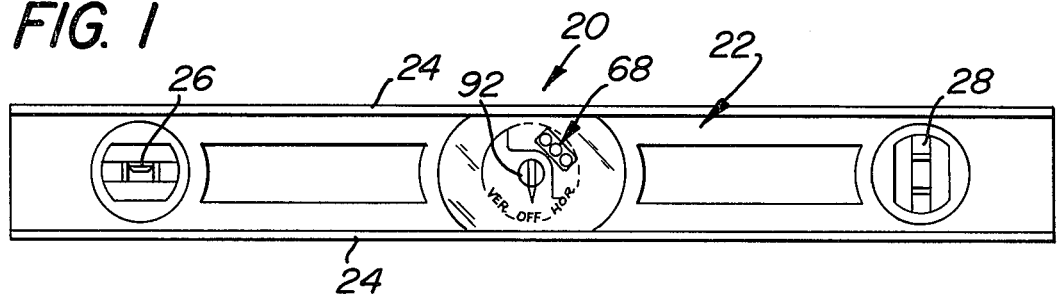
FIG. 1 is a front elevational view of a level in accordance with the instant invention shown in the OFF position.

Referring now to the various figures of the drawing wherein like reference characters refer to like parts, there is shown in FIG. 1 level 20 in accordance with the instant invention. As can be seen, level 20 has an elongated housing 22 of the same overall shape as conventional spirit levels and includes an elongated straight edge 24. A horizontally mounted spirit vial 26, of the conventional type, is mounted adjacent the left end of the level 20 as shown in FIG. 1 and a similar spirit vial 28 is mounted vertically adjacent the right end of the level. The housing 22 may be constructed of various materials, such as metals, plastics, etc.

In accordance with the instant invention the midportion of the level includes means for enabling the level to be used either horizontally or vertically and to provide a visual indication, in the form of a light signal, to indicate when the level is in the desired orientation and when it is deviated from said orientation. In the latter case the electrical means also provides a signal to indicate the direction of the deviation from the desired orientation.

Electrical power means, preferably in the form of conventional serially connected batteries 30 (FIG. 4) are mounted in the midportion of the housing, via respective clips 32. Rotatable mounting means 34 (FIGS. 4 and 5) is disposed in the housing at the mid-point thereof. The mounting means 34 comprises a disc 36 mounted for rotation about the mid-point of the housing. Main ON/OFF switching means 38, to be described in detail later, are connected to the rotatable mounting means. The rotatable switching means has orientation sensing means in the form of switching means mounted on its rear side.

In accordance with one preferred embodiment of the invention, namely, the embodiment shown in FIGS. 4-8, the orientation sensing means comprises a pair of switches 40 and 42. As can be seen, each switch is of the mercury contact type and includes a glass envelope 44 into which three electrodes 46, 48 and 50 extend. The glass envelope is sealed and includes a nippled end 52. A globule of an electrically conductive liquid, such as mercury, 54 is contained within the envelope 44 of the switch. As can be seen, electrode 46 is the longest electrode and extends into the envelope 44 for substantially the full length thereof terminating at a downwardly projecting free end portion 56 disposed closely adjacent to nippled end 52. The mid-portion of electrode 56 includes downward projections 58. Electrode 48 extends for a substantial distance within the envelope 44 and includes a downwardly projecting free end portion 60 lying substantially midway between end portion 56 and mid-portion 58 of electrode 46. Electrode 50 is the shortest of the three electrodes and includes a downwardly projecting free end 62 lying on the opposite side from projecting portion 58 as projection 60 of electrode 48. As will be appreciated by those skilled in the art, the switches 40 and 42 just described comprise what can be considered to be single pole, double throw switches, with electrode 46 serving as a common contact electrode and with globule 54 serving to connect common contact 46 to either electrodes 48 or 50. To that end, as will be appreciated by those skilled in the art, when the envelope of the switch is tilted such that the mercury globule is disposed adjacent the nippled end 52 the projections 60 and 56 of electrodes 48 and 46, respectively, make contact with the globule and are thus electrically interconnected thereby. In a similar manner when the envelope 44 is tilted such that the globule is furthest from the nippled end 52 the globule electrically interconnects electrodes 46 and 50 via respective projections 58 and 62.

As will be described in detail hereinafter, the rotatable mounting means 34 is adapted to be rotated from a first position, in which its longitudinal axis, shown in FIG. 4 and identified by reference numeral 64, is parallel to the straight edge 24 of the housing through an arc of 90° to a second position wherein axis 64 lies perpendicular to straight edge 24. As will be appreciated, when the level 20 is in the horizontal position and the rotatable means is in the first position axis 64 is horizontal and when the level is vertical (the straight edge 24 vertical) and the rotatable mounting means 34 is in the second position, the axis 64 is still horizontal. The reason for this feature will be readily appreciated hereafter.

Figure 4:
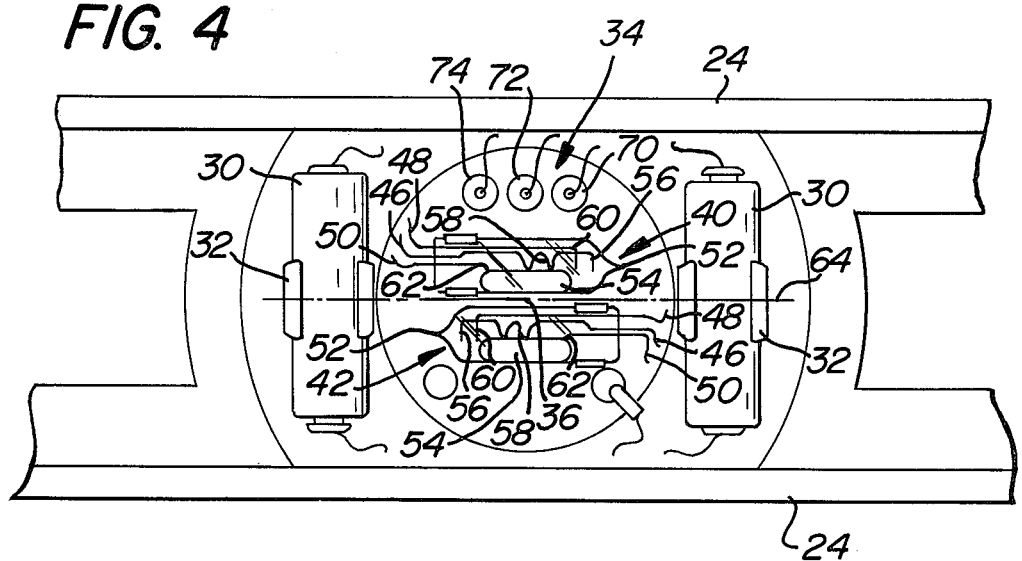
FIG. 4 is an enlarged rear elevational view of a portion of the level shown in FIG. 1.

As can be seen clearly in FIG. 4, the two switches 40 and 42 are mounted on rotatable mounting means 34 via clips 66 and are so oriented such that when axis 64 is in the first position and is horizontal envelope 44 of the switch is tilted slightly with its nippled end 52 upward from axis 64 such that globule 54 bridges common electrode 46 and electrode 50. Switch 42 extends in the opposite direction as switch 40 and its nippled end 52 is tilted slightly with respect to axis 64 such that when the rotatable mounting means 34 is in the first position globule 54 of switch 42 bridges electrodes 46 and 50.

In accordance with the preferred aspect of the instant invention indicating means 68 are provided to give a visual indication of the orientation of the level. To that end, the indicating means comprises three lamps 70, 72 and 74. The lamps are connected, via circuitry, to be described hereinafter, to the series batteries 30, the mercury switches 40 and 42 and the main switch means 38.

As can be seen in FIG. 6, the negative side of the series batteries 30 is electrically connected to one side of each of the lamps 70, 72 and 74. The other side of lamp 70 is connected, via line 76, to electrode 50 of switch 42. The other side of lamp 72 is connected, via line 78, to electrode 48 of switch 42. The other side of lamp 74 is connected, via line 80, to electrode 50 of switch 40. The electrode 46 of switch 42 is connected, via line 82, to electrode 48 of switch 40. The positive side of the series batteries 30 is connected, via line 84, to a common contact 86 of main switch means 38. Main switch means 38 also includes a pair of contacts 87 and 88 which are connected together, via line 90, to common electrode 46 of switch 40. As will be appreciated from a description of the mechanical aspects of switch means 38, to follow, when the level is set for horizontal use, that is when the rotatable mounting means 34 is oriented as shown in FIG. 4, contact 86 and contact 87 of main switch means 38 are electrically interconnected to enable the batteries 30 to provide electrical energy to effect the illumination of either lamps 70, 72 or 74, depending upon the orientation of the level with regard to the horizontal direction. In a similar manner switch 38 is arranged to enable the batteries 30 to effect the energization of the appropriate lamp when the level is arranged for vertical use by the electrical interconnection of contact 86 and contact 88 of main switch means 38.

Figure 2:
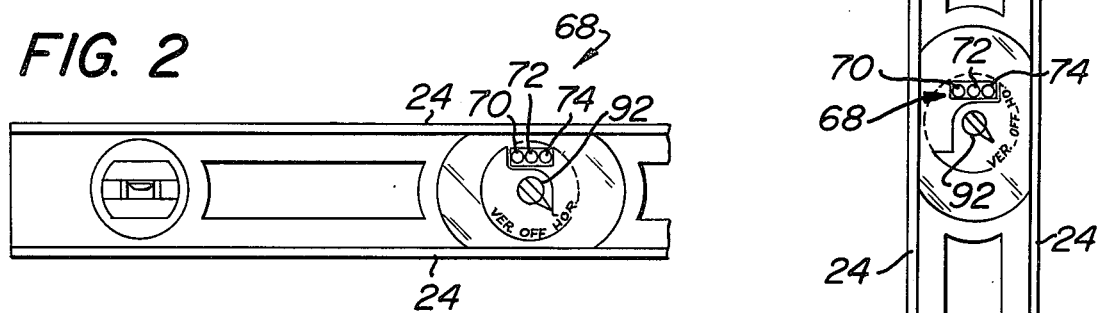
FIG. 2 is a front elevational view of a portion of the level of FIG. 1 set up for horizontal operation.
Figure 3:
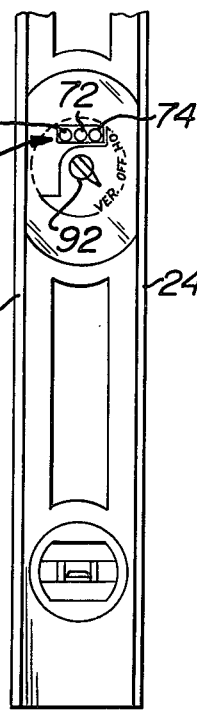
FIG. 3 is a view similar to that of FIG. 2 but showing the level set up for vertical orientation.

As can be seen in FIGS. 2, 3 and 6, lamps 70, 72 and 74 are mounted such that irrespective of whether the level 20 is horizontal or vertical lamp 72 is located in the center, with lamp 70 to the left and lamp 74 to the right. The circuitry of the level 20 is operative to illuminate lamp 72 when the straight edge of the level is either horizontal or vertical, depending upon the rotational position of the mounting means 34. For example, when the mounting means 34 is in the position shown in FIGS. 2 and 4, that is with its axis horizontal, the electrical circuitry will effect the illumination of lamp 72 whenever straight edge 24 is horizontal. In a similar manner when the rotatable mounting means 34 is rotated to the second position wherein axis 64 is perpendicular to straight edge 24 (such that the level is arranged for vertical use as shown in FIG. 3), lamp 72 is illuminated whenever the straight edge 24 is vertical. In the event that there is some deviation from the desired orientation of the level either lamp 70 or 74 will illuminate, depending upon the direction of the deviation. For example, in the event that the level is set up for horizontal use with the rotatable mounting means 34 oriented as shown in FIGS. 2 and 4, if the left side of the level is low lamp 70 illuminates. Conversely if the right side of the level is low the lamp 74 illuminates.

The operation of the circuitry of the level 20 for the three conditions described immediately above can best be appreciated by reference to FIGS. 6, 7 and 8.

To that end, in FIG. 6 there is shown the condition of the switches 40 and 42 when the right end of the level is low and with the level being set up for horizontal use. To that end, as can be seen, in the condition shown in FIG. 6 the following electrical circuit is complete: the positive side of batteries 30 is connected, via line 84, through interconnected contacts 86 and 87 of main switch means 38, and line 90 to the common electrode 46 of switch means 40. Electrode 46 is electrically interconnected to electrode 50 of switch 40 by the globule of mercury 54 bridging said electrodes. Electrode 50 of switch 40 is connected, via line 80, to one side of the RIGHT SIDE lamp 74. The other side of the RIGHT SIDE lamp 74 is connected to the negative side of batteries 30, thereby completing the circuit and effecting the illumination of RIGHT SIDE lamp 74.

In FIG. 7 there is shown the condition of switches 40 and 42 when the left end of the level is low. As will be appreciated in such a condition an electrical circuit is completed as follows: the positive side of batteries 30 is connected, via line 84, electrically interconnected contacts 86 and 87 of main switch means 38, line 90, bridged electrodes 46 and 48 of the switch 40, line 82, bridged electrodes 46 and 50 of switch 42, line 76 and LEFT SIDE lamp 70 to the negative side of batteries 30. This action effects the illumination of LEFT SIDE lamp 70.

In FIG. 8 there is shown the condition of switches 40 and 42 when the level 20 is horizontal. In such a condition the following circuit is completed: the positive side of batteries 30 is connected, via line 84, interconnected contacts 86 and 87 of main switch means 38, line 90, bridged electrodes 46 and 48 of switch 40, line 82, bridged electrodes 46 and 48 of switch 42, line 78 and lamp 72 to the negative side of batteries 30. This action effects the illumination of CENTER lamp 72.

Attention is now directed to FIG. 5 wherein the mechanical details of the main ON/OFF switch means 38 is shown in conjunction with the rotatable mounting means 34. As can be seen, mounting means 34 comprises a circular disc having a threaded central opening 91. The opening is adapted to receive the threaded shaft (not shown) of a rotary selector means in the form of pointer knob 92 (FIG. 1). The knob 92 serves as the means for rotating the rotable mounting means 34 about its center 36 (FIG. 4) and includes a pointer arranged to point at indicia on the housing to thereby indicate whether the level is operative for vertical use, horizontal use, or is "OFF". As will be appreciated by reference to FIG. 6, when switch 38 is in the OFF position the batteries 30 are disconnected from the switches and hence are disabled from effecting the illumination of any of the lamps 70, 72 or 74.

As can be seen clearly in FIG. 5, the lamps 70, 72 and 74 are mounted within openings in the rotatable mounting means 34 and disposed behind colored lenses 94, 96 and 98, respectively. In accordance with a preferred aspect of this invention lens 96 is one color, e.g., green, while lenses 94 and 98 are another color, e.g., red, such that when lamp 72 illuminates a green indication signal is provided whereas when lamps 70 or 74 illuminate a red signal is provided.

The rotatable mounting means is mounted in the housing and for rotation about point by pivot means (not shown).

As can be seen, rotatable mounting means 34 includes an offset opening 100. Disposed within offset opening 100 is a spring biased, electrically conductive contact 102. Contact 102 serves as the means for bridging common contact 86 and either horizontal contact 88 or vertical contact 90 of main switch means 38. The contacts 86, 87 and 88 of main switch means 38 are in the form of conductive surfaces on the rear side of a contact plate 104. As can be seen in FIG. 5, plate 104 is a generally disc-like circular member having an L-shaped recess 106 in its periphery, with each leg of the recess 106 being at least co-extensive in size with the area defined by lenses 94, 96 and 98. Contact plate 104 is stationarily mounted in the housing 22 of the level directly in front of the rotatable mounting means 34. As can be seen in FIG. 5, the contact plate 104 includes a central opening 108 which is co-axial with threaded opening 91. The shaft of the indicator knob 92 extends through opening 108 and is connected to rotatable mounting means 34 by its insertion in threaded opening 91. This arrangement permits knob 92 to rotate mounting means 34 from the horizontal position through the OFF position to the vertical position, and vice versa. The rear surface 110 of the contact plate 104 includes two electrically conductive surfaces 112 and 114. The conductive surfaces 112 and 114 are physically separated from one another by a strip 116 and hence electrically isolated from each other. Electrically conductive surface 112 of the contact plate 104 serves as both the horizontal and vertical contacts 87 and 88, respectively, of main switch means 38. To that end, conductive surface portion 112 is connected, via a conductive tab 118 to conductor 90. Conductor 90 extends through an opening 120 in contact disc 104. The conductive surface 114 serves as the common contact 86 of the main switch means 38. To that end, an electrically conductive tab 122 is electrically connected to surface 114, with conductor 84 being electrically connected to tab 122. Three recesses or openings 124, 126 and 128 are provided in the rear surface of the contact plate 104 and are contiguous with the electrically conductive surfaces in which said openings extend. The openings 124, 126 and 128 lie on a circular arc, the radius of which is the same as the radial distance between the center of opening 91 and contact 102 of rotatable mounting means 34. In addition, openings 124 and 128 each lie on the strip 116 spacing conductive portions 112 and 114, whereupon each opening makes contact with both of said conductive portions. Opening 126 lies on the arc midway between openings 124 and 128.

As should thus be appreciated, since rotatable mounting means 34 is adapted for rotation about point 36, while fixed contact plate 120 remains stationary in front of it, the spring biased electrically conductive contact 104 may be seated within any of the openings 124, 126 or 128, depending upon the rotational position of rotatable mounting means 34. For example, when the knob 92 is in the position wherein its pointer points in the direction of the legend HORIZONTAL on the housing as shown in FIG. 2 the rotatable mounting means 34 is in the position wherein the spring biased contact 102 is disposed within opening 124. This action electrically bridges conductive surfaces 112 and 114, thereby electrically interconnecting contacts 86 and 87 of the main switch means 38. When the level 20 is to be turned off the knob 92 is rotated such that its pointer points in the direction of the legend OFF as shown in FIG. 1. In this position the rotatable mounting means is in the orientation, wherein contact 102 is disposed within opening 126. Since opening 126 is fully disposed within contact surface 114 and isolated from surface 112, the disposition of contact 102 in opening 126 does not connect the batteries 30 to the circuitry via switch 38. When knob 92 is rotated to the position such that its pointer points to the legend VERTICAL, that is when the level is to be used for vertical measurements, the rotatable mounting means is in the position wherein biased contact 102 is disposed within opening 128. As will be appreciated, when contact 102 is disposed within opening 128 conductive surfaces 112 and 114 are bridged in the same manner as occurs when contact 102 is disposed in opening 124, thereby electrically connecting the batteries 30 to the rest of the circuitry of the level.

It should also be noted that the coaction of spring biased contact 102 and openings 124, 126 and 128 effects the locking of the rotatable mounting means in the position set.

In accordance with the preferred aspect of this invention a transparent or translucent plate or window serves to cover the contact plate 104 and the rotatable mounting means 34, with only the indicator knob 92 extending therethrough.

Figure 9:
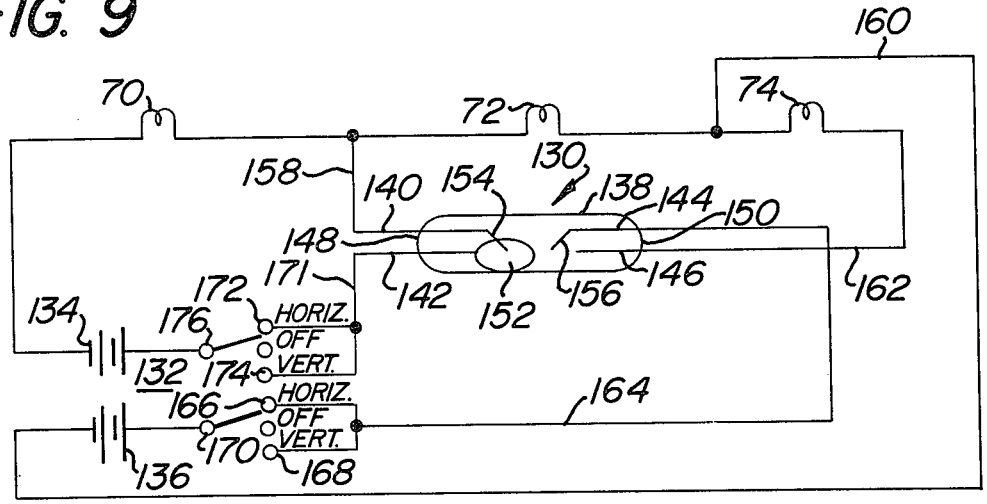
FIG. 9 is a schematic view of an alternative embodiment of the electric circuitry forming the level of FIG. 1 and with the switch being shown in full in the condition wherein the left side of the level is low.
Figure 10:
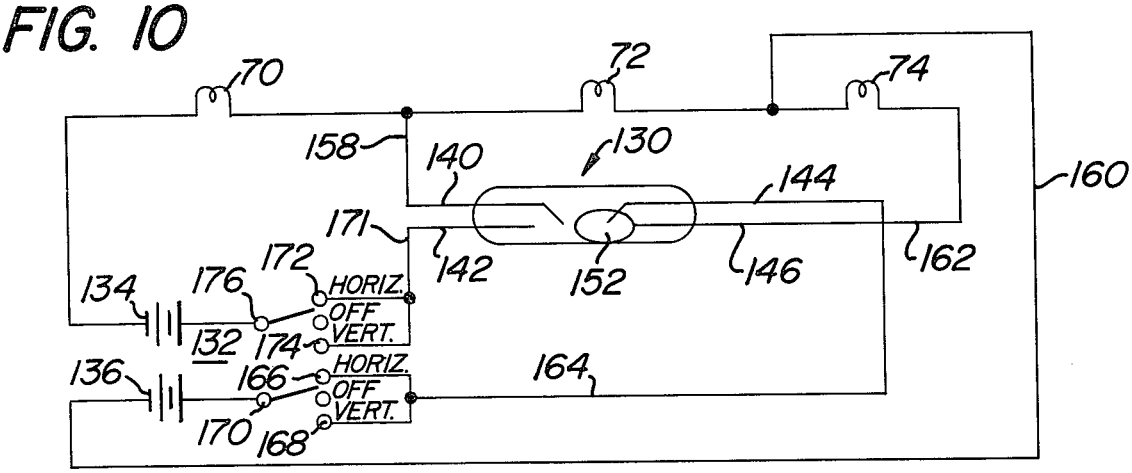
FIG. 10 is a schematic view similar to that of FIG. 9 but showing the switch when the right side of the level is low.
Figure 11:
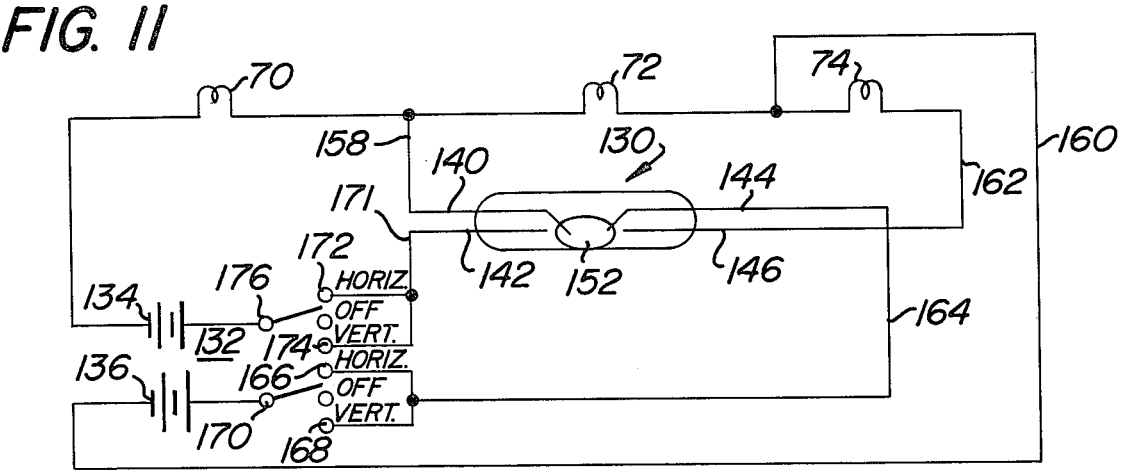
FIG. 11 is a view similar to that of FIGS. 9 and 10 but showing the condition of the switch when the level is level.

In FIGS. 9, 10 and 11 there is shown the schematic diagram of an alternative embodiment of the level of the instant invention. In the alternative embodiment a single four-electrode, mercury switch 130 is utilized in lieu of the two, three-electrode switches 40 and 42 of the embodiment shown in FIGS. 4–8. In addition, different main switch means 132 are utilized than described heretofore and a pair of power sources, namely batteries 134 and 136 are used in lieu of the single power source formed of the serially connected batteries 30.

As can be seen in FIG. 9, switch means 130 comprises an elongated envelope 138 through which four electrodes, 140, 142, 144 and 146 extend. The envelope includes a right and a left sealed end 148 and 150, respectively. Disposed within the envelope 138 is a globule of conductive liquid, such as mercury, 152. As can be seen, electrodes 140 and 144 extend further into the envelope than do electrodes 142 and 146. The free end 154 of electrode 140 extends downward and toward the center of the envelope 130. In a similar manner the free end 156 of electrode 144 extends downward and toward the center of the envelope. The switch means 130 and its component electrodes are configured such that when the envelope 152 is oriented with the left side 148 lower than the right side 150 the mercury globule bridges and free end 154 of electrode 140 and the free end of electrode 142. In a similar manner when the right side 150 of the envelope of switch 30 is lower than the left side 148, the globule of mercury 152 bridges the free end 156 of electrode 144 and the free end of electrode 146. When the envelope 138 of switch means 130 is horizontal the globule of mercury remains at approximately the mid portion of the envelope and bridges the free end 154 of electrode 140 and the free end 156 of electrode 144.

The interconnection of the electrodes of switch 130, the indicator lamps 70, 72 and 74, the power sources 134 and 136 and the main switching means 132 can best be appreciated by reference to FIG. 9. As can be seen therein, the negative side of battery 134 is connected to one side of left indicator lamp 70. The other side of left indicator lamp 70 is connected to one side of CENTER indicator lamp 72 and to a conductor 158. The conductor 158 is connected to electrode 140 of switch means 130. The other side of CENTER indicator lamp 72 is connected to one side of RIGHT indicator lamp 74 and to conductor 160. The conductor 160 is connected to the negative side of battery 136. The other side of RIGHT indicator lamp 74 is connected to conductor 162 which is in turn connected to electrode 146 of switch means 130. Electrode 144 of switch means 130 is connected to a conductor 164 which is in turn connected to a pair of contacts 166 and 168 of main switching means 132. Contact 166 serves as the horizontal contact while contact 168 serves as the vertical contact. Switching means 132 also includes a common contact 170 which is adapted to be selectively connected to either the horizontal contact 166 or the vertical contact 168. Common contact 170 is connected to the positive terminal of battery 136. Electrode 142 is connected to a conductor 171 which is in turn connected to a pair of stationary contacts 172 and 174 of switch means 132. Contact 172 serves as the horizontal contact and contact 174 serves as the vertical contact. Switch means 132 also includes another stationary contact 176. Contact 176 is adapted to be selectively connected to either the horizontal contact 172 or the vertical contact 174 by means to be described hereinafter. Contact 176 is connected to the positive side of battery 134.

As will be described in detail hereinafter, switch means 132 is adapted to enable each of the batteries 134 and 136 to provide power to the indicator lamps 70, 72 and 74 when the pointer knob 92 is rotated to either the HORIZONTAL or VERTICAL positions, as described heretofore.

Operation of the level 20 with the circuitry shown in FIGS. 9–11 is as follows: in the event that the left side of the level is low the mercury globule 152, as noted heretofore, bridges electrodes 140 and 142. Accordingly, a circuit is created including battery 134, contacts 176 and 172 of the main switch means 132, conductor 171, electrode 142, mercury globule 152, electrode 140, conductor 158, and indicator 70. Accordingly, the indicator lamp 70 illuminates. In the case where the right side of the level 20 is lower mercury globule 152 bridges electrodes 146 and 144 as shown in FIG. 10. In such a condition the circuit is completed including the following elements: battery 136, common contact 170 and horizontal contact 166 of main switch means 132, conductor 164, electrode 144, mercury globule 152, electrode 146, conductor 162, right indicator lamp 74, and conductor 160.

In FIG. 11 there is shown the condition of the circuitry when the level is in the desired horizontal orientation. To that end, the globule of mercury 152 is located at the mid-portion of the switch means 132 to thereby bridge electrodes 140 and 144. This action creates a circuit among the following elements: battery 136, common contact 170 and horizontal contact 166 of main switch means 132, conductor 164, electrode 144, mercury globule 152, electrode 140, indicator lamp 72, and conductor 160. The completion of this circuit effects the illumination of lamp 72, thereby indicating a horizontal condition.

It should be appreciated by those skilled in the art that when the main switch means 132 is in the position wherein common contacts 170 and 176 are connected to vertical stationary contacts 168 and 174, respectively, the circuitry will operate in the same manner as described heretofore to indicate the existence of a vertical orientation or a deviation to the right or left therefrom.

Attention is now directed to FIG. 12 wherein the mechanical details of the main ON/OFF means 132 is shown in conjunction with the rotatable mounting means 34. As can be seen, the mounting means 34 basically is constructed in an identical manner as mounting means 34 shown in FIG. 5 except for the presence of two offset openings 178 and 180. Disposed within offset opening 178 is spring biased electrically conductive contact 182. Disposed within offset opening 180 is an spring biased electrically conductive contact 184. The contact 182 serves as the means for bridging common contact 176 and either horizontal contact 172 or vertical contact 174 of main ON/OFF switch means 132. In a similar manner the spring biased electrically conductive contact 184 serves as the means for bridging common contact 170 and either horizontal contact 166 or vertical contact 168 of the main ON/OFF switch means 132. The contacts 166, 168, 170, 172, 174 and 176 are in the form of conductive surfaces on the rear side of contact plate 104. To that end, the rear surface of the contact plate includes four electrically conductive surfaces. The conductive surfaces 186 and 188 are physically separated from conductive surfaces 190 and 192 by a strip 194 and are hence electrically isolated from each other. Similarly, conductive portions 186 and 188 and conductive portions 190 and 196 are physically separated for one another by a circular strip 196 and are hence electrically isolated from each other. Electrically conductive surface 186 serves as both the horizontal and vertical contacts 172 and 174, respectively, of main ON/OFF switch means 132 while electrically conductive surface 186 serves as the common contact 176 thereof. In a similar manner electrically conductive surface 192 serves as both the horizontal and vertical contacts 166 and 168, respectively, of main ON/OFF switch 132 while electrically conductive surface 190 serves as the common contact 170 thereof. To that end, conductive surface portion 188 is connected, via tab 198, to conductor 171. Surface 186 is connected, via a tab 200, to a conductor electrically connectecd to the positive terminal of battery 134. In a similar manner conductive surface 192 is connected, via a tab 202, to conductor 164 and conductive surface 190 is connected, via a tab 204, to the conductor connected to the positive terminal of battery 136. Four recesses or openings 206, 208, 210 and 212 are provided in the rear surface of the contact plate 104 and are contiguous with the electrically conductive surfaces in which the openings extend. The openings 206, 108, 210 and 212 lie on the circular strip 196. The radius of the circular strip is the same as the radial distance between the center of opening 91 and spring biased contacts 182 and 184 of the rotatable mounting means 34. As can be seen, each of the openings makes contact with both of the conductive surface portions with which it is contiguous. The circumferential spacing between openings 206 and 210 are the same as the spacing between spring biased contacts 182 and 184, whereupon contact 182 may be seated in opening 206 at the same time that contact 184 is seated in opening 210. In a similar manner the circumferential distance between opening 208 and opening 212 is the same as between the spring biased contacts 182 and 184 such that when contact 182 is disposed within opening 208 contact 184 is disposed within opening 212. As should be appreciated from the foregoing, when the rotatable mounting means 34 is rotated to the position wherein contact 182 is seated in opening 206 and contact 184 is seated in opening 210 the circuitry 132 is in the position shown in FIGS. 9-11 wherein spring biased contact 182 bridges conductive surfaces 186 and 188, thereby effecting the connection between common contact 176 and horizontal contact 172 of switch means 132. At the same time the disposition of contact 184 within opening 210 effects the electrical interconnection of surfaces 192 and 190. This action results in the electrical interconnection of common contact 170 and horizontal contact 166 of main switch means 132.

As will be appreciated by those skilled in the art, when the knob 92 is rotated such that the rotatable mounting means 34 is in the position wherein it spring biased contacts 182 and 184 are disposed within openings 208 and 212, the main switch means will be in the position wherein common contact 176 and vertical contact 174 are electrically interconnected and common contact 170 and vertical contact 168 are electrically interconnected, thereby setting the level for vertical operation.

Without further elaboration, the foregoing will so fully illustrate my invention that others may, by applying current or future knowledge, readily adapt the same for use under various conditions of service.

What is claimed as the invention is:

1. A level for the determination of either a horizontal or vertical orientation, for indicating a deviation therefrom and for providing a signal indicative of said orientation or deviation and the direction thereof, comprising, a housing having a first straight edge, electrical power means mounted on said housing, ON/OFF switch means, rotary selector means for selecting the orientation to be sensed by said level and coupled to said ON/OFF switch means, rotatable mounting means coupled to said ON/OFF switch and rotary selector means, first orientation sensing, mercury switching means mounted on said rotatable mounting means generally parallel to a first axis of said rotatable mounting means and electrical illuminating means also mounted on said rotatable mounting means, said rotatable mounting means being rotatable by said rotary selector means from a first orientation through a ninety degree arc to a second orientation, and vice versa, to enable said first axis of said rotatable mounting means to be brought into a generally horizontal orientation irrespective of whether the straight edge of said level is oriented generally horizontally or vertically, said rotatable mounting means also being rotatable by said rotary selector means to a third orientation, said rotatable mounting means having a right and left side irrespective of whether said means is in said first or second orientation and including means for locking said rotatable mounting means in either of said first or second orientations, said ON/OFF switch being connected to said electrical power means to energize the electrical illuminating means when said rotatable mounting means is in either said first or second orientations and to deenergize the electrical illuminating means when said rotatable mounting means is in said third orientation, said first mercury switching means being positioned on said rotatable mounting means such that when its first axis is disposed horizontally said first switching means completes a first circuit from said electrical power means through the ON/OFF switch to the electrical illuminating means to provide a first signal, when the left hand side of the rotatable mounting means is disposed below the right side thereof said first switching means completes a second circuit from said power means through the ON/OFF switch to the electrical illuminating means to provide a second signal and when the right side of the rotatable mounting means is disposed below the left side said first switching means completes a third circuit from said power means through the ON/OFF switch to the electrical illuminating means to provide a third signal.

2. The level of claim 1 wherein said first signal is provided at one location, said second signal is provided at a location to the left of said one location and said third signal is provided at a location to the right of said one location.

3. The level of claim 2 wherein said first mercury contact switching means comprises a pair of similar mercury contact switches each of which comprises a first, second and common contact and a movable mercury contactor, said first circuit being established by the contactor of one switch bridging the first and common contacts thereof while the contactor of the other switch bridges the second and common contacts thereof, said second circuit being established by the contactor of each switch bridging the first and common contacts thereof and said third circuit being established by the contactor of each of said switches bridging the second and common contacts thereof.

4. The level of claim 3 wherein the light emitted is one color when said first circuit is completed and is another color when said second and third circuits are completed.

5. The level of claim 2 wherein said first mercury contact switching means comprises a unitary switch including a first, second, third and fourth contact and a movable, mercury contactor, said first circuit being established by the contactor bridging said first and third contacts of said switch to connect said power source means to said light emitting means, said second circuit being established by the contactor bridging said first and second contacts of said switch to connect said power source means to said light emitting means and said third circuit being established by the contactor bridging said third and fourth contacts to connect said power source means to said light emitting means.

6. The level of claim 5 wherein the light emitted is one color when said first circuit is completed and is another color when said second and third circuits are completed.

* * * * *